United States Patent [19] [11] 4,095,013
Burger [45] June 13, 1978

[54] REUSABLE SOLAR CONTROL FILM AND METHOD OF MAKING
[75] Inventor: Thomas J. Burger, St. Paul, Minn.
[73] Assignee: Minnesota Mining and Manufacturing Company, Saint Paul, Minn.
[21] Appl. No.: 796,873
[22] Filed: May 16, 1977
[51] Int. Cl.² .............................................. B32B 27/30
[52] U.S. Cl. ................................ 428/522; 427/372 R; 428/335; 428/354; 428/355; 428/483; 428/918
[58] Field of Search ............... 428/336, 335, 354, 355, 428/483, 522, 918; 427/372
[56] References Cited
U.S. PATENT DOCUMENTS

| | | |
|---|---|---|
| 2,774,421 | 12/1956 | Lion ...................................... 428/918 |
| 3,290,203 | 12/1966 | Antonson et al. .................... 428/918 |
| 3,308,004 | 3/1967 | Rouault ................................ 428/458 |
| 3,619,335 | 11/1971 | Bryan ................................... 428/483 |
| 3,681,179 | 8/1972 | Theissen .............................. 428/336 |
| 3,958,065 | 5/1976 | Ranck .................................. 428/483 |
| 4,031,281 | 6/1977 | Keeling ................................ 428/483 |

Primary Examiner—William J. Van Balen
Attorney, Agent, or Firm—Cruzan Alexander; Donald M. Sell; Richard E. Brink

[57] ABSTRACT

Solar control film incorporating a "cling" adhesive layer so that it can be repeatedly applied to and removed from a windowpane. The adhesive layer is obtained by coating on the film a solvent-soluble vinyl chloride or vinylidene chloride copolymer containing a vinyl stabilizer, a tack-inhibiting polymeric modifier and a plasticizer for vinyl resins.

6 Claims, 1 Drawing Figure

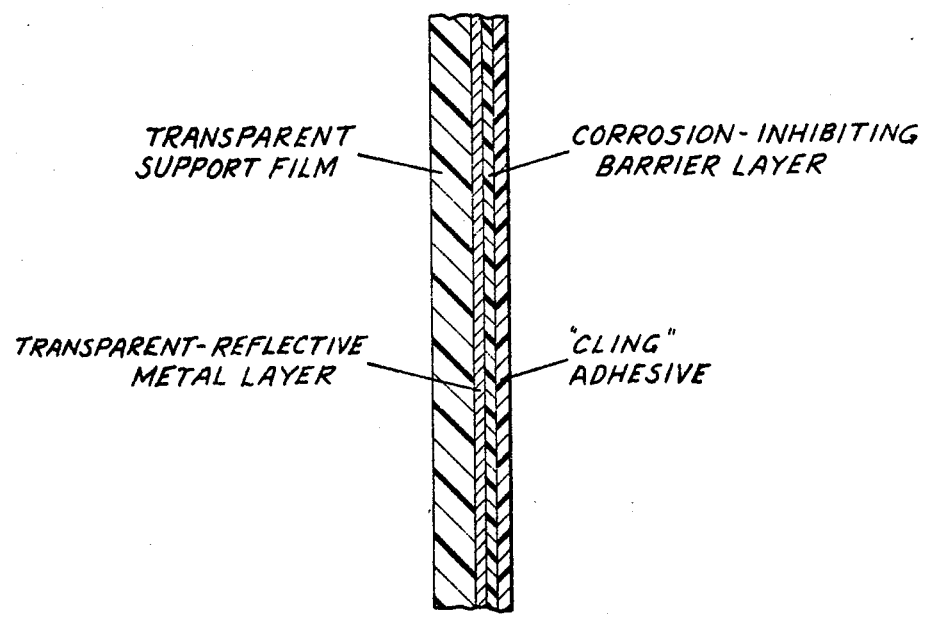

REUSABLE SOLAR CONTROL FILM AND METHOD OF MAKING

BACKGROUND OF THE INVENTION

In one respect, this invention is related to solar control film adapted for bonding to windowpanes. In another aspect, the invention relates to a method of manufacturing solar control films.

It has long been recognized that a transparent or translucent film could be coated with a thin transparent-reflective metallic layer and used to control the solar radiation entering a room. For example, Lion U.S. Pat. No. 2,774,421 discloses roller-mounted window shades in which a transparent or translucent film is coated with a thin layer of vapor-deposited aluminum which may in turn be overcoated with a protective lacquer or varnish. While effective to a degree, Lion's window shade is spaced from the inner surface of a windowpane, thus permitting a considerable amount of heat to be admitted into the room.

Antonson et al U.S. Pat. No. 3,290,203 discloses a solar control film which, like Lion's, utilizes a transparent film which is metallized with a transparent-reflective aluminum layer on one face and provided with a protective overcoating. In the Antonson et al product, however, a water-activatible adhesive is employed to bond the solar control film directly to the inner surface of a windowpane, thereby greatly reducing the amount of solar energy which would otherwise enter the room, be absorbed by objects therein, and be re-emitted as heat. Another type of water-activated adhesive is shown in Theissen U.S. Pat. No. 3,681,179, where a normally tacky and pressure-sensitive adhesive is coated over the film and temporarily inactivated by an overcoating of a water-soluble material. In both the Antonson et al and Theissen products, water is applied to the exposed coated surface, the windowpane (or both), the film placed in contact with the window and slid into position, and a squeegee thereafter being used to ensure intimate contact between the film and the windowpane. While both the Antonson et al and Theissen products have enjoyed widespread commercial success, there has been a desire for a solar control film product which could be utilized during the hot summer months and removed during the cold winter months. Although both the Antonson et al and Theissen solar control films can be removed, the process of removal is likely to destroy or distort them so that they cannot thereafter be easily reapplied.

For several years, various types of removable and replaceable solar control film have been available in the marketplace. In one embodiment, the solar control film has been simply a metallized biaxially oriented polyethylene terephthalate film in which the metallized layer is overcoated with a "cling" adhesive consisting essentially of a solvent-soluble polyester adhesive. In another embodiment, the "cling" adhesive is a plasticized vinyl film laminated to the structure by means of the soluble polyester adhesive. In the latter product, the structure adheres to a windowpane because of the plasticizer which exudes from the vinyl polymer and forms almost a monomolecular layer between the solar control film and the windowpane. While both types of product are easily applied and can be removed after being adhered to a windowpane for a comparatively short period of time, long-term exposure results in an adhesion buildup such that the solar control film is prone to distortion upon removal, effectively preventing it from being reapplied. Additionally, laminated products of the second type require both a coating and a laminating step, increasing the cost of manufacture.

SUMMARY OF THE INVENTION

The present invention provides a solar control film which is not tacky, which can be applied to a windowpane and allowed to remain in place for several months, removed at the end of the extended exposure to the rays of the sun without distortion, rolled on itself and stored until the next summer season, and again applied to the windowpane. Solar control films of the invention can be repeatedly applied, removed, and reapplied in this manner.

The solar control film of the invention is comparatively simple and inexpensive and is superior to the prior art solar control films incorporating plasticized vinyl films in that it does not increase in adhesion, even when exposed to temperatures on the order of 65° C for extended periods of time.

In accordance with the invention, a solar control film is provided with a thin, transparent "cling" adhesive stratum, or layer, of plasticized resin composition. This composition consists essentially of 100 parts by weight of plasticized solvent-soluble copolymer of vinyl monomers, consisting essentially of either (a) 80-97 parts by weight vinyl chloride and 3-20 parts by weight of monomers selected from the group consisting of vinyl acetate, vinyl alcohol and dibasic acid or (b) vinylidene chloride:acrylonitrile copolymer. The vinyl chloride copolymers are characterized by solubility of 20 parts by weight in 100 parts by weight of a 50:50 toluene:methylethyl ketone blend at room temperature, while the vinylidene chloride copolymers are similarly characterized by solubility of 20 parts by weight in 100 parts by weight of a 30:70 toluene:methylethyl ketone blend at room temperature. The vinyl copolymer may also contain small amounts of dibasic acid monomer.

In addition to the vinyl or vinylidene chloride copolymer, the coating contains 1-5 parts by weight of at least 1 lubricating, chlorine-scavenging light stabilizer for vinyl resins. This stabilizer is a liquid soap selected from the class consisting of (a) soaps having one or more metallic cations selected from the group consisting essentially of barium, cadmium and zinc and (b) tin soaps.

The "cling" adhesive layer also contains 5-100 parts by weight of at least one plasticizer for vinyl resin.

An especially important component of the "cling" adhesive layer is 5-200 parts by weight of at least one tack-controlling, adhesion buildup-inhibiting polymeric modifier selected from the class consisting of polymethylmethacrylate, polyethylmethacrylate, polyisobutylmethacrylate, poly-n-butylmethacrylate, poly-n-butylmethylmethacrylate, and n-butylmethacrylate:isobutylmethacrylate copolymer.

In accordance with the method of the invention, a reusable solar control sheet material is made by a process comprising the steps of (a) providing a self-supporting transparent film having a transparent-reflective layer of metal bonded to one face thereof, a layer of polymeric material protectively overlying the metal coat, (b) providing an organic solvent solution of the "cling" adhesive components mentioned in the preceding paragraphs, (c) applying a thin coating of the solution over the layer of protective polymeric material and (d) evaporating the solvent.

BRIEF DESCRIPTION OF THE DRAWING

The single FIGURE of the drawing depicts a crosssectional view of a solar control product made in accordance with the invention.

DESCRIPTION OF PRESENTLY PREFERRED EMBODIMENTS

As an aid to understanding the invention, a series of tabulated examples will be shown below. In each of these examples, a 2-mil (50-micron) biaxially oriented polyethylene terephthalate film was vapor-coated with aluminum to achieve a visible light transmission of approximately 20%. Over the aluminum vapor coating was then knife-coated through a 2-mil (50-micron) opening, a solution of the following components:

| COMPONENT | PARTS BY WEIGHT |
| --- | --- |
| Soluble polyester resin ("Vitel" PE222, commercially available from Goodyear Chemical Company) | 26.95 |
| Ultraviolet light absorber ("Cyasorb" U.V. 24, commercially available from American Cyanamid Company) | 0.14 |
| Methylethyl ketone | 37.00 |
| Toluene | 35.91 |
| | 100.00 |

The coating was dried by exposing it for 10 minutes to the radiation from a 230-watt infrared lamp at a distance of 8 inches (20 centimeters), leaving a dried coating which weighed approximately 5.5 grams/m$^2$ and had a thickness of approximately 0.15 mil (4 microns). The purpose of this coating is to provide a protective layer over the aluminum coating and inhibit its oxidation, all as is disclosed more fully in the aforementioned Antonson et al U.S. Pat. No. 3,290,203.

In each of the examples (unless otherwise noted), the following "cling" adhesive solution was then coated over the polyester protective coating:

| COMPONENT | PARTS BY WEIGHT |
| --- | --- |
| Vinyl or vinylidene chloride copolymer | 100 |
| Plasticizer for vinyl resins | as shown |
| Tack-controlling, adhesion buildup-inhibiting polymeric modifier | as shown |
| Stabilizer for vinyl resins | as shown |
| Solvent (1:1 toluene:methylethyl ketone blend for vinyl chloride copolymer or 3:7 toluene:methylethyl ketone blend for vinylidene chloride copolymer) | 500 |

The adhesive solution was applied with a knife coater having a 2-mil (50-micron) opening and the solvent evaporated to leave a dry coating which weighed approximately 5.5 grams/m$^2$ and had a thickness of about 0.15 mil (4 microns).

Test Procedure

Each of the tabulated examples was tested as follows:

Adhesion Buildup.

A sheet of solar control film approximately 6 cm × 18 cm was applied to cleaned, moistened plate glass and a squeegee used to remove excess water. The glass-solar control film laminate was then dried, film-side up, for at least 4 days at approximately 20° C, 20% relative humidity. Adhesion of the solar control film to the glass was measured by slitting a portion of the film between razor blades spaced 1 inch (about 2.5 cm) apart, doubling the 1-inch (2.5 cm) strip of film back of itself at 180°, and measuring the force required to remove it at a rate of 4 cm/second.

A second glass-solar control film laminate was prepared and dried in the same manner as the first and thereafter heated for 16 hours at 65° C and 20% relative humidity. Adhesion of the film to glass was then measured in the same way as for the first sample. (It has been found empirically that this heating process subjects the solar control film to conditions similar to those encountered inside a recreational vehicle parked in summer sunshine.)

Peel Resistance.

To measure the ability of the solar control film of the invention to cling to the surface of glass to which it is applied and resist being inadvertently peeled therefrom — or even falling off the windowpane shortly after being applied thereto — an additional test was run on the film of some examples. In this test, a 2-inch × 7-inch (51 mm × 178 mm) sample of the product was applied to 3/8-inch (9.5 mm) plate glass and allowed to dry, all as described above. A 1-inch (2.5 cm) strip of strongly adherent normally tacky and pressure-sensitive adhesive tape was then adhered to the exposed surface of the solar control film, the strip extending across the 2-inch (51-mm) dimension of the solar control film parallel to and 1 inch (2.5 cm) from one end. A paper clip was inserted over the top of the adhesive tape so that it extended between the tape and the solar control film. To the opposite end of the paper clip was then attached a 500-gram weight. The glass-solar control film laminate was then positioned so that it was mounted at 30° to the vertical, with the solar control film being on the upper surface and the adhesive tape at the upper end. The time required for the solar control film to pull away from the glass was then determined.

Components of Cling Adhesive Composition

To simplify the presentation of examples in tabular form, individual components of the "cling" adhesive are designated by abbreviations; the component indicated by each abbreviation is shown below:

| VINYL CHLORIDE COPOLYMER | | | | |
| --- | --- | --- | --- | --- |
| | Weight % of Comonomers | | | Intrinsic viscosity in cyclohexanone at 20° C. |
| Abbreviation | Vinyl Chloride | Vinyl Acetate | Other | |
| VAGH | 91 | 3 | 6 (vinyl alcohol) | 0.54 |
| VMCH | 86 | 13 | 1 (dibasic acid) | 0.50 |
| VYHD | 86 | 14 | 0 | 0.42 |
| VYHH | 87 | 13 | 0 | 0.50 |
| VYLF | 87 | 13 | 0 | 0.24 |
| VYNS | 90 | 10 | 0 | 0.80 |
| VYNW | 97 | 3 | 0 | 1.07 |

| VINYLIDENE CHLORIDE COPOLYMER | |
| --- | --- |
| Abbreviation | Description |
| F220 | 80:20 vinylidene chloride:acrylonitrile copolymer, a 20% methylethylketone solution having a Brookfield viscosity of about 80 |

-continued

VINYLIDENE CHLORIDE COPOLYMER

| Abbreviation | Description |
|---|---|
| | cps at 25° C., commercially available from Dow Chemical Company under the trade designation "Saran" F220 |

PLASTICIZERS

| Abbreviation | Description |
|---|---|
| A 562 | Medium molecular weight polyester, formed by reacting approximately 2.1 mols adipic acid, 1.1 mols propylene glycol, 1.5 moles 1,4-butanediol and 1.0 mole C-12 fatty acid, having a viscosity of approximately 15 stokes at about 25° C.; commercially available from Ashland Chemical Company under the trade designation "Admex" 562 |
| A761 | Medium molecular weight polyester formed by reacting approximately 2.3 moles adipic acid, 0.8 mole phthalic acid, 2 moles propylene glycol, 1.6 moles of 1,4-butanediol, and 1.0 mole C-12 fatty acid; commercially available from Ashland Chemical Company under the trade designation "Admex" 761 |
| A770 | Medium molecular weight polyester, having a viscosity of 38 stokes at 25° C.; commercially available from Ashland Chemial Company under the trade designation "Admex" 770 |
| G-25 | Sebacic acid:propylene glycol polyester, molcular weight about 8000, viscosity 2200 poises at 25° C.; commercially available from Rohm and Haas Company under the trade designation "Paraplex" G-25 |
| G-40 | Adipic acid:propylene glycol polyester plasticizer, molecular weight about 6000, viscosity 2000 poises at 25° C.; commercially available from Rohm and Haas Company under the trade designation "Paraplex" G-40 |
| G-54 | Aliphatic polyester plasticizer, molecular weight about 3300, viscosity 53 poises at 25° C.; commercially available from Rohm and Haas Company under the trade designation "Paraplex" G-54 |
| G-62 | Epoxidized soybean oil, molecular weight about 1000, viscosity 3.4 poises at 25° C.; commercially available from Rohm and Haas Company under the trade designation "Paraplex" G-62 |
| P9750 | Medium molcular weight polymeric plasticizer, typically having an acid volume of 1.9, a hydroxyl value of 19.0, a specific gravity of 1.06 at 25° C., and a viscosity at 100° F. (38° C.) of 8.57 strokes; commercially available from Emery Industries, Inc. under the trade designation "Plastolein" 9750 |
| S79TM | Trialkyl trimellitate (essentially linear 7-9 carbon linear alcohol), molecular weight 560, visocisty 5460 stokes at 25° C.; commercially available from Monsanto Chemical Company under the trade designation "Santicizer" 79-TM |
| S409 | Medium molecular weight liquid aliphatic polyester having a specific gravity of 1.082-1.084 and viscosity of approximately 3.2 stokes at 25° C.; commercially available from Monsanto Chemical Company under the trade designation "Santicizer" 409 permanent plasticizer |
| S711 | Liquid modified polyester formed by reacting phthalic acid with a combination of 7-, 9-, and 11-carbon alcohols, having a viscosity of 44 centistokes at 25° C.; commercially available from Monsanto Chemical Company under the trade designation "Santicizer" 711 |
| V7191 | Epoxidized triglyceride containing 9.0-9.1% oxirane oxygen, having a specific gravity of 1.02 at 25° C. and a viscosity of 6.5-8.5 stokes; commercially available from Viking Chemical Company under the trade designation "Vikoflex" 7191 |
| X-100 | Polyester formed from sebacic acid and, it is believed, propylene glycol; commercially available from Rohm and Haas Company under the trade designation "Paraplex" X-100 |

STABILIZER FOR VINYL RESINS

| Abbreviation | Description |
|---|---|
| 180 | Liquid barium-cadmium stabilizer having a specific gravity of 1.022 at 25° C.; commercially available from Argus Chemical Corporation under the trade designation "Mark 180" |
| 462 | Liquid barium-cadmium composition having a specific gravity of 1.033 at 25° C.; commercially available from Argus Chemical Corporation under the trade designation "Mark 462" |
| 462A | Liquid barium-cadmium-zinc stabilizer containing low zinc level, having a specific gravity of 0.988 at 25° C.; commercially available from Argus Chemical Corporation under the trade designation "Mark 462A" |
| 462B | Liquid barium-cadmium-zinc stabilizer containing medium zinc level, having a specific gravity of 0.993 at 25° C.; commercially available from Argus Chemical Corporation under the trade designation "Mark 462B" |
| 462C | Liquid barium-cadmium-zinc stabilizer containing high zinc level, having the specific gravity of 0.984 at 25° C.; commercially available from Argus Chemical Corporation under the trade designation "Mark 462C" |
| 1414A | Organotin compound, having a specific gravity of 1.208 at 25° C.; commercially available from Argus Chemical Corporation under the trade designation "Mark 1414A" |
| A-101 | 40% methylethyl ketone solution of polymethylmethacrylate, a 35% solids solution having a Brookfield viscosity in the range of 700-1400 cps at 25° C., commercially available from Rohm and Haas Company under the trade designation "Acryloid" A-101 |
| B-66 | 40% toluene solution of 1:1 n-butylmethacrylate:methylmethacrylate, having a Brookfield viscosity of 235-325 cps at 25° C.; commercially available from Rohm and Haas Company under the trade designation "Acryloid" B-66 |
| DINP | Diisononylphthalate |
| DMP | Dimethylphthalate |
| DOP | Dioctylphthalate |
| DOA | Dioctyladipate |
| E-2041 | Polymethylmethacrylate having a typical inherent viscosity of 1.20; commercially available from E. I. Du Pont de Nemours & Company under the trade designation "Elvacite" 2041 |
| E-2043 | Polyethylmethacrylate having a typical inherent viscosity of 0.20, commercially available from E. I. Du Pont de Nemours & Company under the trade designation "Elvacite" 2043 |
| E-2044 | High molecular weight poly-n-butylmethacrylate having a typical inherent viscosity of 0.53; commercially available from E. I. Du Pont de Nemours & Company under the trade designation "Elvacite" 2044 |
| E-2045 | High molecular weight polyisobutylmethacrylate having a typical inherent viscosity of 0.66; commercially available from E. I. Du Pont de Nemours & Company under the trade designation "Elvacite" 2045 |
| E-2046 | 1:1 (mole ratio) n-butylmethacrylate:isobutylmethacrylate having a typical inherent viscosity of 0.61; commercially available from E. I. Du Pont de Nemours & Company under the trade designation "Elvacite" 2046 |

In the following examples, all parts are by weight.

EXAMPLES 1-10

Vinyl Copolymer

These examples all incorporate 100 parts of vinyl polymer, 40 parts G-40 plasticizer, 5 parts G-62 plasticizer, 2 parts 462 stabilizer and 25 parts A-101 modifier. Only the type of vinyl copolymer is varied.

| Ex. | Vinyl Copolymer | Adhesion g/cm, after conditioning at | | Time to fail in cling test, hours at indicated temperature | | |
|---|---|---|---|---|---|---|
| | | 20° C | 65° C | 4° C | 21° C | 49° C |
| — | | 2 | 40 | | | |

Comparison example based on prior art

-continued

| | | | | | |
|---|---|---|---|---|---|
| commercial product of polyvinyl chloride plasticized with a X-100 and laminated to metallized polyester film | | | | | |
| 1 | VYHH | 2 | 80 | 2 | 1 | 2 |
| | VYHH | 2 | 10 | 120 | >120 | 168 |

It will be observed that the commercial prior art product displays the simultaneous disadvantages of (1) being excessively difficult to remove from a windowpane after exposure to high temperatures and (2) perversely failing to adhere as firmly to a windowpane during normal use conditions as would be desired.

| Example | Resin | Parts | Adhesion 20° | Adhesion 65° |
|---|---|---|---|---|
| 1a* | VYHH | 2 | 2 | |
| 2 | VYNS | 4 | 14 | |
| 3 | VYNW | 2 | 40 | |
| 4 | VYLF | 10 | 12 | |
| 5 | VYHD | 10 | 14 | |
| 6 | 1:1 VYHH:VYNS | 6 | 20 | |
| 7 | 1:1 VYHH:VAGH | 2 | 20 | |
| 8 | 1:1 VYHH:VYNS | 6 | 20 | |
| 9 | 1:1 VYHH:VYNW | 2 | 14 | |
| 10 | 1:1 VYHH:VAGH | 2 | 20 | |

*Contains 0.5 pats 2,2',4,4' tetrahydroxybenzophenone, a UV absorber which is commonly used in compositions based on polyvinyl chloride.

EXAMPLES 11 and 12

Vinylidene Chloride Copolymer

These examples incorporate 100 parts F220, 40 parts G-40 plasticizer, 5 parts G-62 plasticizer, 2 parts 462 stabilizer and the indicated amounts of A-101 modifier.

| | | adhesion, g/cm, after conditioning at | |
|---|---|---|---|
| Example | Parts A-10 Modifier | 20° C. | 65° C. |
| 11 | 25 | 4 | 20 |
| 12 | 100 | 8 | 20 |

EXAMPLES 13 – 37

Variations in plasticizer for vinyl resins

Each composition listed below is identical to that of Example 1 except for (a) the use of a different plasticizer system and (b) variations in the amount of detackifier.

| | Plasticizer | | Parts A-101 | Adhesion, g/cm, after conditioning at | |
|---|---|---|---|---|---|
| Example | Type | Parts | modifier | 20° C. | 65° C. |
| 13 | P9750 | 40 | | | |
| | G-62 | 5 | 25 | 8 | 20 |
| 14 | A770 | 40 | | | |
| | G-62 | 5 | 25 | 8 | 20 |
| 15 | V7191 | 40 | | | |
| | G-62 | 5 | 25 | 2 | 40 |
| 16 | G-25 | 40 | | | |
| | G-62 | 5 | 25 | 6 | >100 |
| 17 | G-25 | 40 | | | |
| | G-62 | 5 | 100 | 2 | 10 |
| 18 | DOP | 40 | | | |
| | G-62 | 5 | 25 | 10 | 100 |
| 19 | DOP | 40 | | | |
| | G-62 | 5 | 100 | 8 | 8 |
| 20 | A562 | 40 | | | |
| | G-62 | 5 | 25 | 4 | >100 |
| 21 | A562 | 40 | | | |
| | G-62 | 5 | 100 | 2 | 18 |
| 22 | S111 | 40 | | | |
| | G-62 | 5 | 25 | 30 | >100 |
| 23 | S111 | 40 | | | |
| | G-62 | 5 | 100 | 4 | 6 |
| 24 | DIN | 40 | | | |
| | G-62 | 5 | 25 | 10 | >100 |

-continued

| | Plasticizer | | Parts A-101 | Adhesion, g/cm, after conditioning at | |
|---|---|---|---|---|---|
| Example | Type | Parts | modifier | 20° C. | 65° C. |
| 25 | DIN | 40 | | | |
| | G-62 | 5 | 100 | 10 | 10 |
| 26 | S79TM | 40 | | | |
| | G-62 | 5 | 25 | 2 | >100 |
| 27 | S79TM | 40 | | | |
| | G-62 | 5 | 100 | 2 | 4 |
| 28 | DMP | 40 | | | |
| | G-62 | 5 | 25 | 2 | >100 |
| 29 | DMP | 40 | | | |
| | G-62 | 5 | 100 | 8 | 6 |
| 30 | G-62 | 40 | 25 | 2 | 10 |
| 31 | S409 | 40 | 25 | | |
| | G-62 | 5 | | 2 | 12 |
| 32 | G-54 | 40 | 25 | | |
| | G-62 | 5 | | 2 | 20 |
| 33 | DOA | 40 | | | |
| | G-62 | 5 | 100 | 2 | 4 |
| 34 | A562 | 40 | | | |
| | G-62 | 5 | 100 | 2 | 18 |
| 35 | S111 | 40 | | | |
| | G-62 | 5 | 100 | 4 | 6 |
| 36 | A761 | 40 | | | |
| | G-62 | 5 | 100 | 2 | 8 |
| 37 | G-40 | 40 | | | |
| | V7191 | 5 | 100 | 20 | 40 |

EXAMPLES 38 – 43

Stabilizer for Vinyl Resins

The following examples are all identical to Example 1 except for the use of a different stabilizer for the vinyl resins: In each example, however, the total amount of stabilizer employed was 2 parts, as in Example 1.

| | | Adhesion, g/cm, after conditioning at | |
|---|---|---|---|
| Example | Stablizer | 20° C. | 65° C. |
| 38 | 180 | 20 | 20 |
| 39 | 462A | 10 | 20 |
| 40 | 462B | 10 | 20 |
| 41 | 462C | 2 | 10 |
| 42 | 1414A | 2 | 30 |
| 43 | Equal amounts of 1414A & 462 | 2 | 10 |

EXAMPLES 44 – 52

Variations in tack-controlling, adhesion buildup-inhibiting polymeric modifier Each of the following examples is identical to Example 1 except for varying the type and amount of modifier.

| | Modifier | | Adhesion, g/cm, after conditioning at | |
|---|---|---|---|---|
| Ex. | Type | Parts by Weight | 20° C. | 65° C. |
| 44 | E2041 | 40 | 2 | 8 |
| 45 | E2043 | 40 | 2 | 100 |
| 46 | E2043 | 60 | 2 | 8 |
| 47 | E2043 | 100 | 2 | 4 |
| 48 | E2044 | 40 | 2 | 20 |
| 49 | E2045 | 40 | 2 | 100 |
| 50 | E2045 | 60 | 2 | 2 |
| 51 | E2046 | 100 | 2 | 2 |
| 52 | B-66 | 50 | 2 | 20 |

The examples set forth above, while numerous, do not purport to be exhaustive. It is believed, however, that they illustrate the types of variation which can be made in the "cling" adhesive coatings employed in the practice of the invention. Numerous other compositions can also be made to function effectively by making suitable adjustments in the ratios of individual components.

Accordingly, what is claimed is as follows:

1. In a solar control sheet material comprising a self-supporting transparent film, a transparent-reflective coat of metal bonded to one face of said film, and a layer of polymeric material protectively overlying said metal coat, said sheet material having particular utility for application to the room side of windowpanes to reduce light transmission and heat transmission from outside, the improvement comprising, bonded to said product over said layer of polymeric material, a thin, transparent stratum of plasticized resin composition, said composition consisting essentially of a blend of
  1. 100 parts by weight of solvent-soluble copolymer of vinyl monomers, consisting essentially of either
     a. 80–97 parts by weight of vinyl chloride and 3–20 parts by weight of monomers selected from the group consisting of vinyl acetate, vinyl alcohol and dibasic acid, or
     b. vinylidene chloride:acrylonitrile copolymer,
  2. 5 to 100 parts by weight of at least one plasticizer for vinyl resins,
  3. 1 to 5 parts by weight of at least one lubricating, chlorine-scavenging light stabilizer for vinyl resins, said stabilizer being a liquid soap selected from the class consisting essentially of
     a. soaps of at least two divalent metals selected from the group consisting essentially of barium, cadmium and zinc, and
     b. tin soaps,
  4. 5 to 200 parts of at least one tack-controlling, adhesion buildup-inhibiting polymeric modifier selected from the class consisting of polymethylmethacrylate, polyethylmethacrylate, polyisobutylmethacrylate, poly-n-butylmethacrylate, poly-n-butylmethylmethacrylate, and n-butylmethacrylate: isobutylmethacrylate copolymer, said stratum being further characterized by adhesion to glass in the range of 2–40 grams per centimeter of width throughout a temperature range of 20° – 65° C., even after exposure to a temperature of 65° C. for 2 weeks, whereby said product can be repeatedly utilized in the cycle of being applied to and firmly bonded to a windowpane, thereafter subjected to a wide range of sun exposure and temperatures for a period of months without either degradation or excessive adhesive buildup, and removed without distortion.

2. The invention of claim 1 wherein at least 2 parts of the plasticizer are epoxidized soybean oil.

3. The invention of claim 1 wherein the vinyl stabilizer is a soap of barium, cadmium and zinc.

4. The invention of claim 1 wherein the plasticized resin contains an effective amount of UV absorber.

5. The invention of claim 1 wherein the vinyl stabilizer is a tin soap.

6. The method of making a reusable solar control sheet material comprising the steps of A. providing a self-supporting transparent film having a transparent-reflective layer of metal bonded to one face of said film, a layer of polymeric material protectively overlying said metal coat, B. providing an organic solvent solution of
  1. 100 parts by weight of copolymer of vinyl monomers consisting essentially of
     a. 80–97 parts by weight of vinyl chloride and 3–20 parts by weight of monomers selected from the group consisting of vinyl acetate, vinyl alcohol and dibasic acid, 20 parts by weight of said copolymer being soluble at room temperature in 100 parts by weight of a 50:50 toluene:methyl ethyl ketone blend, or
     b. vinylidene chloride:acrylonitrile copolymer, 20 parts by weight of said copolymer being soluble of room temperature in 100 parts by weight of a 30:70 toluene:methylethyl ketone blend.
  2. 5 to 100 parts by weight of at least one plasticizer for vinyl resins,
  3. 1 to 5 parts by weight of at least one lubricating, chlorine-scavenging light stabilizer for vinyl resins, said stabilizer being a liquid soap selected from the class consisting essentially of
     a. soaps of at least two divalent metals selected from the group consisting essentially of barium, cadmium and zinc, and
     b. tin soaps,
  4. 5 to 200 parts of at least one tack-controlling, adhesion buildup-inhibiting polymeric modifier selected from the class consisting of polymethylmethacrylate, polyethylmethacrylate, polyisobutylmethacrylate, poly-n-butylmethacrylate, poly-n-butyl methylmethacrylate, and n-butylmethacrylate: isobutylmethacrylate copolymer, C. applying a thin coating of said solution over said layer of protective polymeric material, and D. evaporating said solvent.

* * * * *